US012636955B2

(12) United States Patent
Jeong et al.

(10) Patent No.:    US 12,636,955 B2
(45) Date of Patent:        May 26, 2026

(54) DC-DC CONVERTER, VEHICLE AND CONTROL METHOD INCLUDING THE SAME

(71) Applicants:Hyundai Motor Company, Seoul (KR); Kia Corporation, Seoul (KR)

(72) Inventors: Jae Hun Jeong, Anyang-si (KR); Mun Soo Chung, Uiwang-si (KR); Kyu Won Jeong, Hwaseong-si (KR); Tae Woo Kim, Anyang-si (KR); Jong Dae Kim, Anyang-si (KR); Beom Sik Kim, Gwangmyeong-si (KR); Sang Don Lee, Suwon-si (KR)

(73) Assignees: HYUNDAI MOTOR COMPANY, Seoul (KR); KIA CORPORATION, Seoul (KR)

( * ) Notice:    Subject to any disclaimer, the term of this patent is extended or adjusted under 35 U.S.C. 154(b) by 35 days.

(21) Appl. No.: 18/195,023

(22) Filed:    May 9, 2023

(65)            Prior Publication Data

US 2024/0109419 A1      Apr. 4, 2024

(30)        Foreign Application Priority Data

Sep. 20, 2022    (KR) ......................... 10-2022-0118720

(51) Int. Cl.
B60L 3/00            (2019.01)
B60L 50/75          (2019.01)
H02M 3/158         (2006.01)
(52) U.S. Cl.
CPC ............. B60L 3/0023 (2013.01); B60L 50/75 (2019.02); H02M 3/158 (2013.01); B60L 2210/10 (2013.01)

(58) Field of Classification Search
CPC .... B60L 3/0023; B60L 50/75; B60L 2210/10; B60L 2250/10; B60L 3/0053;
(Continued)

(56)            References Cited

U.S. PATENT DOCUMENTS

| | | | |
|---|---|---|---|
| 7,586,722 B2 | 9/2009 | Scholer et al. | |
| 2008/0027338 A1* | 1/2008 | Lu ........................ | A61B 5/6843 |
| | | | 600/509 |

(Continued)

FOREIGN PATENT DOCUMENTS

| | | | |
|---|---|---|---|
| CN | 105270184 A | * | 1/2016 |
| CN | 113448312 A | | 9/2021 |

(Continued)

*Primary Examiner* — Rexford N Barnie
*Assistant Examiner* — Thai H Tran
(74) *Attorney, Agent, or Firm* — Morgan, Lewis & Bockius LLP

(57)            ABSTRACT

The present disclosure relates to a DC-DC converter, a vehicle, and a control method including the same, and more particularly, to a DC-DC converter, a vehicle, and a control method including the same capable of effectively detecting and responding to an interlock failure of a connector. The present disclosure provides a DC-DC converter including: a plurality of terminals having more than two terminals disposed in the inlet corresponding to one DC link; an interlock recognition circuit electrically connected to the plurality of terminals; and a converter controller determining a connector interlock state of the inlet based on an output terminal state of the interlock recognition circuit, wherein the interlock recognition circuit is configured to determine the output terminal state in response to whether a connector having an interlock connection part for short circuiting different two of the plurality of terminals when the inlet is interlocked and the output terminal state corresponding to the type of the interlock connection part.

13 Claims, 11 Drawing Sheets

(58) Field of Classification Search
CPC .......... B60L 50/72; B60L 58/30; B60L 58/40;
B60L 53/16; B60L 53/22; H02M 3/158;
H02M 3/003; H02M 3/1584; H01M 8/00;
Y02T 10/70; Y02T 90/40
See application file for complete search history.

(56)     References Cited

U.S. PATENT DOCUMENTS

| | | | | |
|---|---|---|---|---|
| 2010/0136379 | A1* | 6/2010 | King | H02J 7/34 |
| | | | | 429/432 |
| 2020/0127424 | A1* | 4/2020 | Choi | H01R 13/707 |
| 2020/0369168 | A1* | 11/2020 | Barker | B60L 53/16 |

FOREIGN PATENT DOCUMENTS

| | | | |
|---|---|---|---|
| JP | 2021-016291 | A | 2/2021 |
| KR | 10-1592780 | B1 | 2/2016 |
| KR | 10-2034818 | B1 | 10/2019 |
| KR | 10-2022-0014990 | A | 2/2022 |
| KR | 10-2022-0040589 | A | 3/2022 |
| KR | 10-2022-0112821 | A | 8/2022 |
| KR | 10-2024-0039859 | A | 3/2024 |

* cited by examiner

| classification | ID0 | ID1 | ID2 |
| --- | --- | --- | --- |
| interlock wiring | | | |

*610*

DC-DC CONVERTER, VEHICLE AND CONTROL METHOD INCLUDING THE SAME

CROSS REFERENCE TO RELATED APPLICATION

The present application claims priority to Korean Patent Application No. 10-2022-0118720, filed on Sep. 20, 2022 in the Korean Intellectual Property Office, the entire contents of which is incorporated herein for all purposes by this reference.

TECHNICAL FIELD

The present disclosure relates to a DC-DC converter, a vehicle, and a control method including the same, and more particularly, to a DC-DC converter, a vehicle, and a control method including the same capable of effectively detecting and responding to an interlock failure of a connector.

BACKGROUND

As the interest in the environment gains traction, developing an electrified vehicle with a motor as a power source has been actively engaged. A fuel cell vehicle (FCEV) can be exemplified as an example of an electrified vehicle. The FCEV may be referred to a vehicle traveled by driving an electric motor with power generated through a chemical reaction between hydrogen and oxygen in the fuel cell. In order to supply power to the motor stably, a high-voltage battery between a fuel cell and a motor driving system including an electric motor and an inverter may be provided, and to increase efficiency and storage capacity, the voltage of the high-voltage battery is increasing.

Accordingly, in the case where the voltage of the high-voltage battery is greater than the voltage of the fuel cell, a DC-DC converter is disposed between the fuel cell and the high-voltage battery and allows a power conversion therebetween. In such case, among both ends of the DC-DC converter, one end connected to a fuel cell with a relatively low voltage may be a low-voltage side (LS), and the other end connected to a high-voltage battery with a relatively high voltage may be a high-voltage side (HS).

The LS and HS of the DC-DC converter, respectively, are provided with inlets, and are connected to each cable connector for exchanging power to corresponding devices. However, during vehicle production or maintenance, either case may occur when the voltage specifications between the connector and the inlet do not match, such as when the connector to be connected to the low side inlet is connected to the high-voltage side, or when two or more DC-DC converters are mounted together in a vehicle, the connector to be connected to its corresponding DC-DC converter can be falsely connected to other DC-DC converter. When the DC-DC converter is operated in false connection, there is a risk that the DC-DC converter itself may fail or other devices thereto may fail.

To overcome the problem mentioned above, a method of providing a difference in length between cables may be considered. However, if a flexible tube such as a corrugated tube is used to protect the outer jacket of the cable, comparing the length between the cables due to elasticity may be difficult, even if the internal cable fixing point is marked on the outside. In addition, a method of applying a key code that makes the mechanical shape of the connector and the corresponding inlet different for each cable may be considered, but the DC-DC converter may not identify the interlocked connector, and it is difficult to expect a key code function that prevents or identifies false connection between connectors if the key code is damaged.

Matters described as the related art are provided merely for promoting understanding for the background of the disclosure, and should not be taken as the prior art already known to a person having ordinary knowledge in the art.

SUMMARY

Therefore, the present disclosure has been made in view of the above problems, and it is an object of the present disclosure to provide a DC-DC converter, a vehicle, and a control method including the same capable of effectively detecting and responding to false connection between connectors.

The technical objects to attain in the present disclosure are not limited to the above-described technical objects and other technical objects which are not described herein will become apparent to those skilled in the art from the following description.

To accomplish the above objects, according to one aspect of the present disclosure, there is provided a DC-DC converter including: a plurality of terminals having more than two terminals disposed in an inlet corresponding to one DC link; an interlock recognition circuit electrically connected to the plurality of terminals; and a converter controller determining a connector interlock state of the inlet based on an output terminal state of the interlock recognition circuit, wherein the output terminal state of the interlock recognition circuit is determined based on whether a connector having an interlock wiring part is connected to the inlet and a type of the interlock wiring part, and wherein the interlock wiring part is configured to short circuit different two of the plurality of terminals when the connector is connected to the inlet.

For example, the interlock wiring part may have a plurality of types according to a combination of two different terminals among the plurality of terminals.

For example, the interlock recognition circuit may include a regulated voltage source; and a plurality of resistors mutually connected between the regulated voltage source and the ground.

For example, one end of the resistor among the plurality of resistors may be connected to the regulated voltage source, and the other end of the resistor may be connected to a node where any one terminal among the plurality of terminals and the one end of another resistor are electrically connected.

For example, the output terminal state may include an output terminal voltage corresponding to the voltage of the node.

For example, the converter controller configured to: determine that the connector is failed to interlock when the output terminal voltage is a first voltage; determine that the connector is normally interlocked when the output terminal voltage is a second voltage; and determine that the connector is erroneously interlocked when the output terminal voltage is a third voltage.

For example, the converter controller may output a warning signal corresponding to the determined result to the outside when it is determined that the connector is failed to interlock or erroneously interlocked.

For example, the number of the plurality of terminals and the number of the plurality of resistors may be the same.

For example, each of the plurality of terminals may be connected to one of connection nodes between two adjacent resistor pairs among the plurality of resistors and the grounds.

For example, each of the plurality of terminals is pin-shaped, and the connector may include a plurality of pin-holes allowing penetration of each of the plurality of terminals.

In addition, a vehicle according to an embodiment of the present disclosure may include a first DC-DC converter and a second DC-DC converter. Here, each of the first DC-DC converter and the second DC-DC converter includes a plurality of terminals having more than two terminals disposed in the inlet corresponding to one DC link; an interlock recognition circuit electrically connected to the plurality of terminals; and a converter controller that determines a connector interlock state of the inlet based on the output terminal state of the interlock recognition circuit, wherein the interlock recognition circuit is configured to determine the output terminal state in response to whether a connector having an interlock wiring part for short circuiting different two of the plurality of terminals when the inlet is interlocked and the output terminal state corresponding to the type of the interlock wiring part. Moreover, the converter controller of the first DC-DC converter and the converter controller of the second DC-DC converter may have different state of the output terminal corresponding to the normal connector interlock state.

For example, the interlock wiring part may have a plurality of types according to a combination of different two among the plurality of terminals.

For example, the interlock recognition circuit may include a regulated voltage source; and a plurality of resistors mutually connected between the regulated voltage source and the ground.

For example, one end of the resistor among the plurality of resistors may be connected to the regulated voltage source, and the other end of the resistor may be connected to a node where any one terminal among the plurality of terminals and the one end of another resistor are electrically connected.

For example, the output terminal state may include an output terminal voltage corresponding to the voltage of the node.

According to an embodiment, a DC-DC converter effectively detect and respond to an interlock failure.

In particular, based on the output voltage of the interlock recognition circuit which changes according to the interlock wiring type of the connector side, the DC-DC converter determines whether there is a connector interlock failure, and when the interlock failure is determined, the protection of the DC-DC converter and the connected device thereof is possible by stopping the interlock failure.

Advantages which may be obtained in this specification are not limited to the aforementioned advantages, and various other advantages may be evidently understood by those skilled in the art to which the present disclosure pertains from the following description.

BRIEF DESCRIPTION OF THE DRAWINGS

FIG. 6A shows an example of an interlock recognition apparatus according to an embodiment.

DETAILED DESCRIPTION

Figure 1:
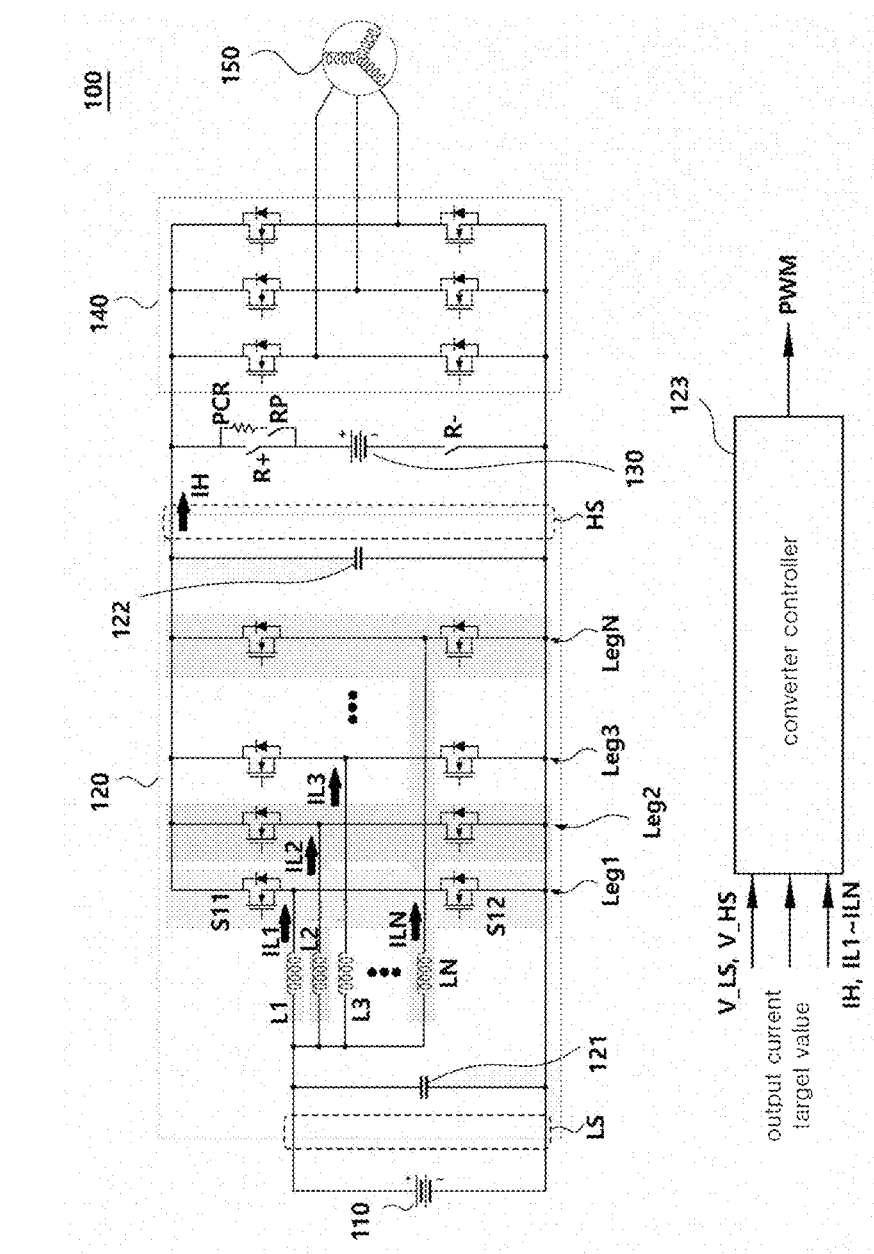
FIG. 1 shows an example of a power electronics system of a fuel cell vehicle according to an embodiment of the present disclosure.

Hereinafter, embodiments of the present disclosure will be described in greater detail with reference to the accompanying drawings. In describing the present disclosure, for ease of understanding, the same reference numerals are used to denote the same components throughout the drawings, and repetitive description on the same components will be omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

Terms such as "first" and "second" may be used to describe various components, but the components should not be limited by the above terms. In addition, the above terms are used only for the purpose of distinguishing one component from another.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

Further, terms "unit" or "control unit" forming part of the names of a motor control unit (MCU), a hybrid control unit (HCU), etc. are merely terms that are widely used in the naming of a controller for controlling a specific function of a vehicle, and should not be construed as meaning a generic function unit. For example, each controller is a communication device that communicates with other controllers or sensors to control the function that is responsible for, a memory that stores an operating system or logic commands and input and output information, and one or more processor that performs determination, calculation, decision, and the like, which is necessary for the control the function that is responsible therefor.

A fuel cell vehicle to which the embodiments are applicable is described below, however, it is for convenience of description, and apparent to those skilled in the art that it may be applied to all vehicle equipped with two batteries having different normal voltage ranges in addition to the hydrogen fuel electric vehicle.

FIG. 1 shows an example of a power electronics system of a fuel cell vehicle according to an embodiment of the present disclosure.

Referring to FIG. 1, a fuel cell vehicle 100 according to an embodiment may include a fuel cell 110; a fuel cell DC-DC converter (FDC) 120 in which the fuel cell 110 is connected to one end; a high-voltage battery 130 connected to the other end of the FDC 120; an inverter 140 in which a DC link is connected to the other end of the FDC 120; and a motor 150 connected to a AC link of the inverter 140.

The fuel cell 110 may output power through a chemical reaction between hydrogen and oxygen. For example, the fuel cell 110 may be formed as a polymer electrolyte membrane fuel cell (PEMFC) and proton exchange membrane fuel cell, but it is exemplary and is not limited thereto.

The FDC 120 may include two DC links, that is, one end electrically connected to the fuel cell 110, and other end electrically connected to the high-voltage battery 130, and perform a function of transforming the voltage of power input from one end to correspond to the voltage of the other end and outputting the voltage to the other end. To this end, the FDC 120 may include a first capacitor 121 for stably maintaining the voltage on one end; a second capacitor 122 for stably maintaining the voltage on the other end; a plurality of inductor-leg pair forming a boost topology or a buck topology for transformation; and a converter controller 123.

According to an exemplary embodiment of the present disclosure, the converter controller 123 may include a processor (e.g., computer, microprocessor, CPU, ASIC, circuitry, logic circuits, etc.) and an associated non-transitory memory storing software instructions which, when executed by the processor, provides the functionalities of the converter controller 123 described herein. Herein, the memory and the processor may be implemented as separate semiconductor circuits. Alternatively, the memory and the processor may be implemented as a single integrated semiconductor circuit. The processor may embody one or more processor(s).

When assuming that the normal voltage range of the fuel cell 110 is relatively lower than the normal voltage range of the high-voltage battery 130, one end may be called as a low voltage side (LS), and the other end may be called as a high-voltage side (HS). The first capacitor 121 is connected between a negative (−) terminal and a positive (+) terminal of the LS, and the second capacitor 122 is connected between a negative (−) terminal and a positive (+) terminal of HS. The first capacitor 121 may be called as a 'low-voltage side capacitor', and the second capacitor 122 may be called as a 'high-voltage side capacitor'.

In addition, a plurality of inductor-leg pair (N number) may be connected in parallel between the low-voltage side capacitor 121 and the high-voltage side capacitor 122. Specifically, one end of each N number of inductors (L1, L2, L3, . . . , and LN) is connected to the positive terminal of the LS. The other end may be connected to one of the corresponding legs among a plurality of legs (Leg1, Leg2, Leg3, . . . , and LegN) to form an inductor-leg pair.

Each of the legs (Leg1, Leg2, Leg3, . . . , and LegN) may include two switching elements mutually connected in series between both ends of the high-voltage side capacitor 122, and a connection node of the two switching elements may be connected to other ends of the inductor forming the inductor-leg pair. For example, a first leg Leg1 includes a first switching element S11 and a second switching element S12 mutually connected in series between both ends of the high-voltage side capacitor 122, and the connection node of two switching elements S11 and S12 are connected to the other ends to form a first inductor-leg pair L1-Leg1. The first switching element S11 may be called as a 'top switching element', and the second switching element S12 may be called as a 'bottom switching element'.

Each switching device may be implemented as a power semiconductor device capable of high-power and high-speed switching, for example, an insulated gate bipolar transistor (IGBT) or a metal oxide semiconductor field effect transistor (MOSFET), and the like, but is not necessarily limited thereto.

In addition, the converter controller 123 may control a state of switching element which configures each of Leg1, Leg3, Leg3, . . . LegN through a pulse width modulation (PWM) based on a low-voltage side current IL1, IL2, IL3, . . . , ILN, a high-voltage side current IH, a voltage V_LS of low-voltage side capacitor 121, a voltage V_HS between both ends of the high-voltage side capacitor 122, and an output current target value. To this end, the FDC 120 may further include a current sensor (not shown) and a voltage sensor (not shown) for measuring a current and a voltage, respectively. Meanwhile, the output current target value may be information transmitted from a fuel cell control unit (FCU), which is to be described later.

The high-voltage battery 130 may be connected between the positive (+) terminal and the negative (−) terminal of the high-voltage side HS through a plurality of switches, for example, a plurality of relays R+, R−, and RP. More particularly, the negative electrode of the high-voltage battery 130 may be selectively connected to the negative terminal of the high-voltage side HS through the relay R−, and the positive electrode of the high-voltage battery 130 may be selectively connected to the positive terminal through the positive relay R+ or a pre-charge relay RP. The pre-charge relay RP may be connected to a pre-charge resistor in series. If the negative relay R− and the positive relay are turned on together, a large inrush current is instantaneously generated for the initial charging of the high-voltage side capacitor 122, which may cause damage to the relay and the capacitor. Therefore, when the pre-charge relay RP is first turned on instead of the positive relay R+ and the negative relay R− is turned on, the inrush current is reduced by the pre-charge resistor PCR connected in series to the pre-charge relay RP, whereby preventing damage to the relay and the capacitor.

When the high-voltage side capacitor 122 is charged more than a predetermined voltage, the positive relay R+ is turned on, and the pre-charge relay RP is turned off. According to an implementation, each relay, R+, R−, and RP may be replaced with other types of switches, such as power semiconductors.

An inverter 140 converts the DC power of the high-voltage battery 130 into multi-phase AC power to drive 140, or AC power generated by the motor 150 may be converted into DC power and transmitted to the high-voltage battery 130. To this end, the inverter 140 may have a plurality of legs corresponding to each of the multi-phase. Since it is apparent to those skilled in the art that the multi-phase motor and the inverter for driving the same may be implemented in various configurations, a detailed description thereof will be omitted.

Based on the above-described power electronic system configuration with reference to FIG. 1, a power system and control system of the fuel cell vehicle will be described with reference to FIGS. 2A and 2B below.

Figure 2A:
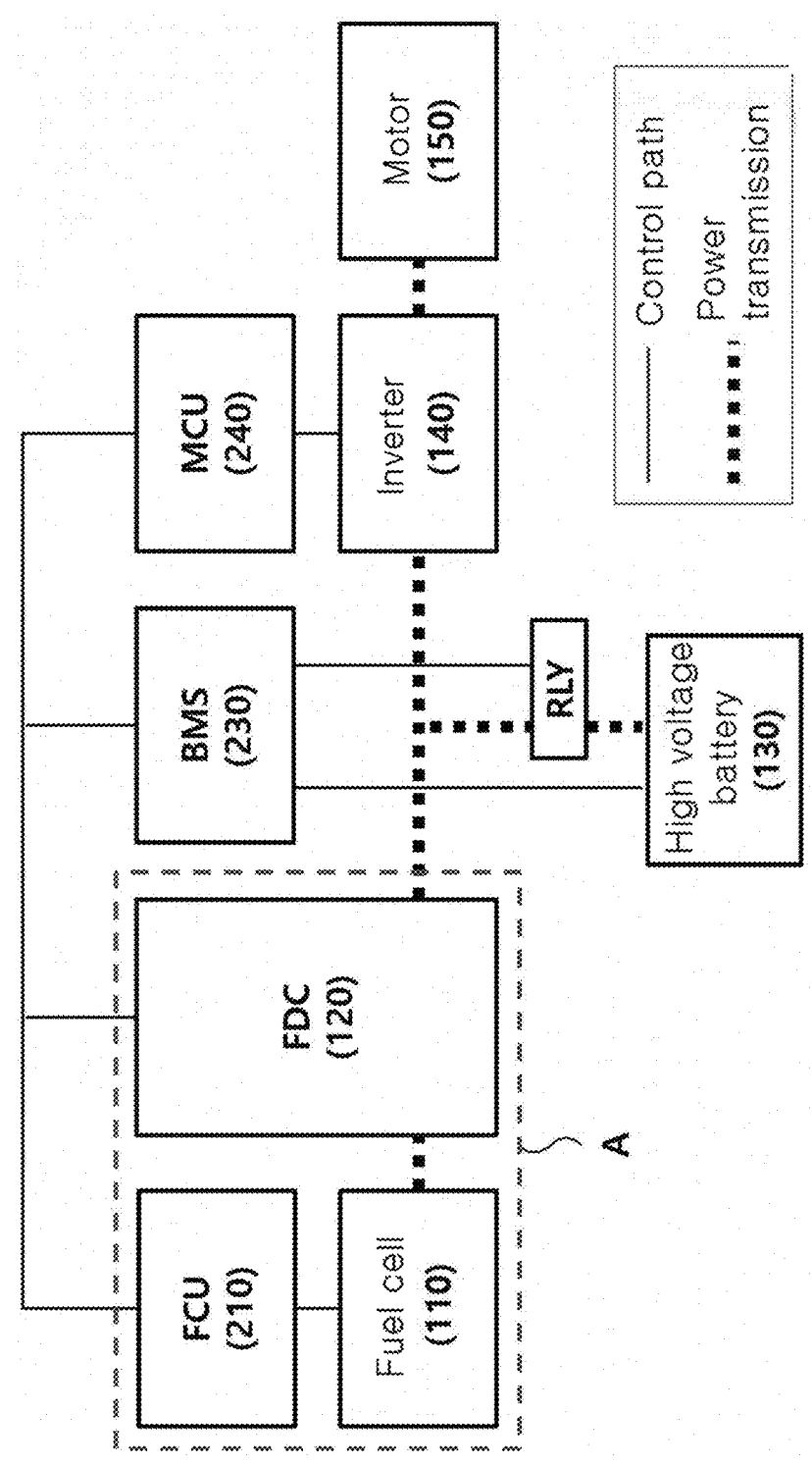
FIG. 2A shows an example of a configuration of a control system of a fuel cell vehicle according to an embodiment of the present disclosure.
Figure 2B:
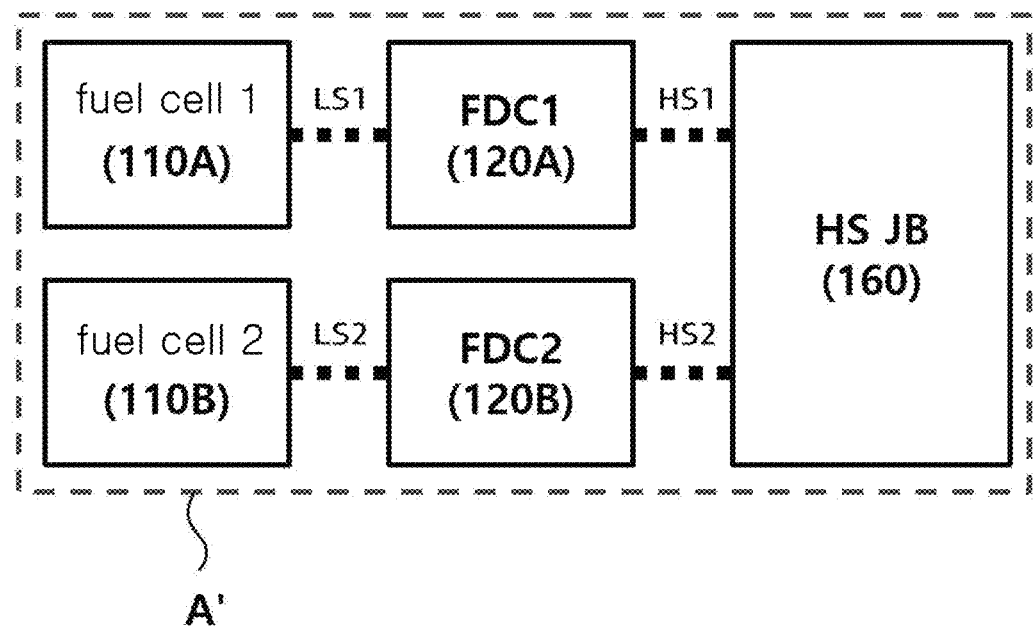
FIG. 2B shows a modified example of a portion 'A' of FIG. 2A.

FIG. 2A shows an example of a control system configuration of a fuel cell vehicle according to an embodiment of the present disclosure and FIG. 2B shows a modified example of portion 'A' of FIG. 2A.

In FIGS. 2A and 2B, a solid line connecting each component represent a control signal transmission path, and a dotted line represents a power transmission path, respectively. In addition, in the description of FIG. 2A, the power transmission path is the same as described with reference to FIG. 1, and thus a redundant description will be omitted.

Referring to FIG. 2A, the fuel cell 110 controls the fuel cell control unit (FCU) 210 and controlling the FDC 120 may be performed by the converter controller 123. In addition, a battery management system (BMS) 230 controls the on and off state of the relay RLY (R+, R−, and RP) and manages the state of the high-voltage battery 130.

The MCU 240 transmits a pulse width modulation (PWM) control signal to a gate drive unit (not shown) based on a motor angle, phase voltage, phase current, demand torque, and the like of motor 150. The gate drive unit may control an inverter (not shown) that drives motor 150.

Each of the control subjects 123, 210, 230, and 240 may exchange information and instructions required for control through communication according to a predetermined vehicle communication protocol, for example, controller area network (CAN) protocol communication.

A plurality of fuel cells that are individually controlled according to the fuel cell may be provided, and in this case, the fuel cell DC-DC converter may be provided for each fuel cell. It will be described with reference to FIG. 2B. In FIG. 2B, a power transmission path is mainly illustrated to assist a straightforward understanding.

In portion 'A' of FIG. 2A, a single FDC 120 is matched to a single fuel cell 110. Contrarily, in FIG. 2B, two fuel cells 110A and 110B are included in the configuration 'A' corresponding to portion 'A' of FIG. 2A, a first fuel cell 110A is connected to the low-voltage side LS1 of a first DC-DC converter (FDC1) 120A, and a second fuel cell 110B is connected to a low-voltage side LS2 of a second DC-DC converter (FDC2) 120B. Each of the high-voltage side HS1 and HS2 of each of the FDC 120A and 120B is connected to one end of a high-voltage side junction box (HS JB) 160. Although not shown in FIG. 2B, other end of the HS JB 160 may be connected to the high-voltage battery 130 and the inverter 140. For example, each of the HS1 and HS2 may be selectively connected in parallel to each other in the HS JB 160. According to the implementation, a low-voltage side junction box (not shown) may be implemented between the low-voltage side LS1 and a first fuel cell 110A of the FDC1 110A of the FDC2 120B, and between the low-voltage side LS2 and a second fuel cell 110B of the FDC2 120B, respectively. In this case, the low-voltage side of the DC-DC converter is connected to the one end of the low-voltage side junction box, and a fuel cell corresponding to the DC-DC converter and an auxiliary device (Fuel Cell_Balance Of Plant, (FC_BOP), not shown) required for driving the stack of the fuel cell may be connected to the other end.

Next, an operation of the converter controller 123 of the FDC 120 through communication with the FCU 210 will be described with reference to FIG. 3.

Figure 3:
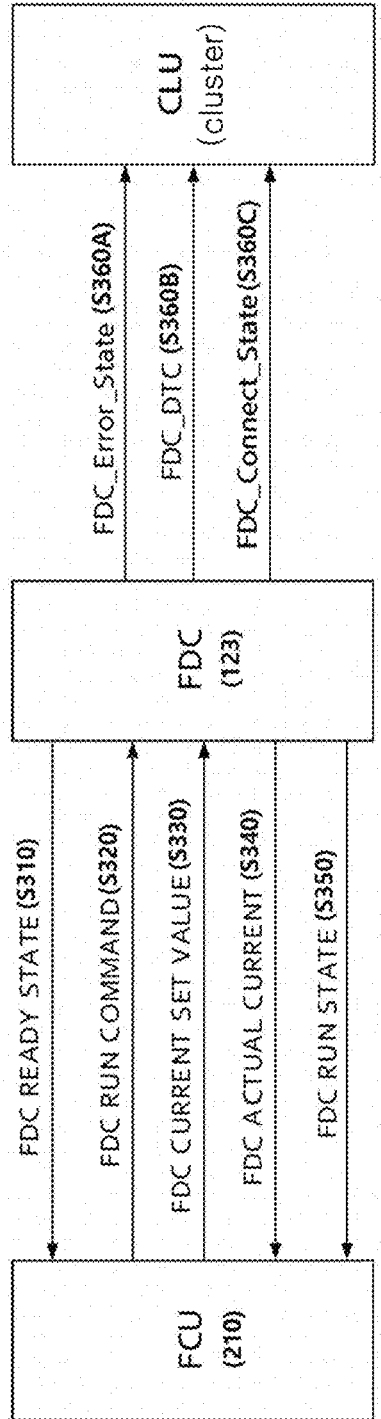
FIG. 3 shows an example of a fuel cell controller, a DC-DC converter, a cluster and exchanging signals among them according to an embodiment of the present disclosure.

FIG. 3 shows an example of a fuel cell controller, a DC-DC converter, and an exchanging signal between clusters according to an embodiment of the present disclosure.

Referring to FIG. 3, the converter controller 123 may transmit a message including a ready on and off state of the FDC 120 or a signal (FDC ready state) to the FCU 210 (S310). When the FDC 120 is in an operation ready state, the FCU 210 transmits an operation start request message FDC RUN COMMAND (S320). In this case, the output current target value FDC CURRENT SET VALUE may also be transmitted (S330). Accordingly, the converter controller 123 drives the FDC 120 to satisfy the output current target value FDC CURRENT SET VALUE. As a result, the current value FDC ACTUAL CURRENT that is actually output from the FDC 120 is transmitted to the FCU 210 (S340). In addition, the converter controller 123 may transmit a message FDC RUN STATE including the operation state RUN ON/OFF of the FDC 120 to the FCU 210 (S350).

Meanwhile, the converter controller 123 may transmit the operation state of the FDC 120 or, when an error is detected during operation information on the detected error to an output device capable of notifying the user S360A, S360B, and S360C). In FIG. 3, a cluster CLU is assumed as an output device, but it is exemplary and is not limited thereto. For example, the output device may be an audio/video/navigation (AVNT) device.

In particular, the converter controller 123 may transmit an error state through a signal FDC_Error_State (S360A) and error information through a signal FDC_DTC (S360B). In addition, the converter controller 123 may transmit information on connector interlock states, such as normal interlock, interlock failure, or interlock error, through the signal FDC_Connect_State (S360C). The cluster CLU may output a corresponding visual effect, such as a warning message, an icon, or a warning lamp, based on a signal received from the converter controller 123 and a preset information output condition.

Figure 4:
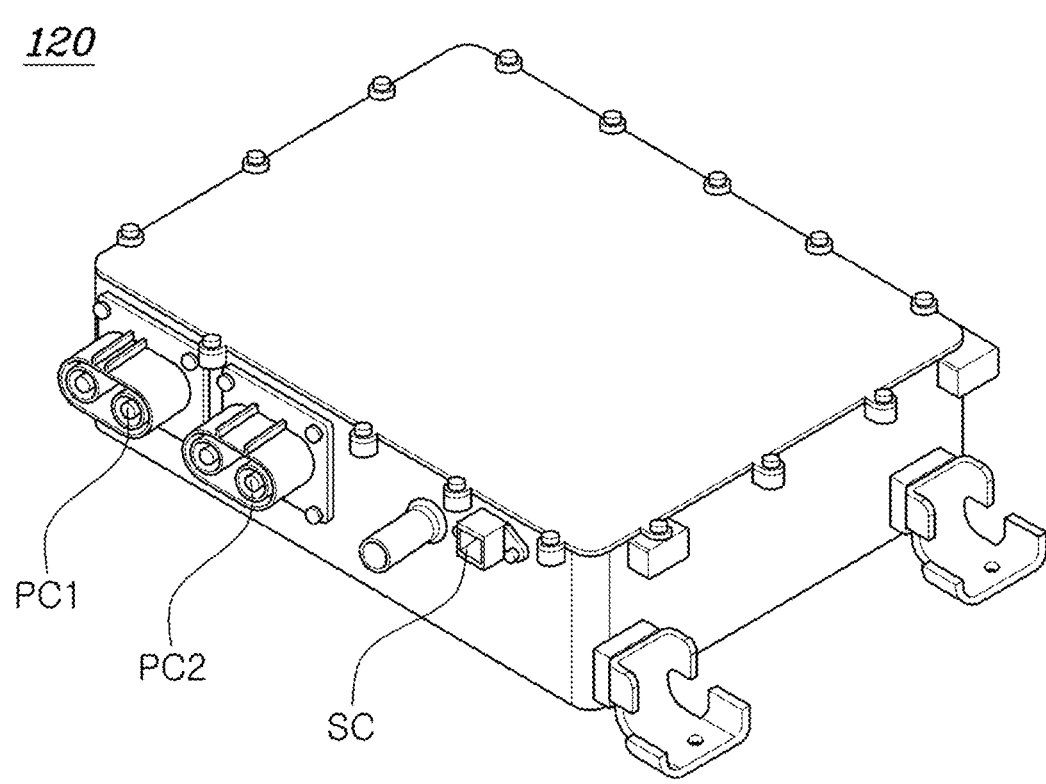
FIG. 4 is a perspective view showing an example of the exterior of a DC-DC converter according to an embodiment.

FIG. 4 is a perspective view showing an example of an external appearance of a DC-DC converter according to an embodiment.

Referring to FIG. 4, two power connector inlets PC1 and PC2, and a control signal connector inlet SC may be included in a FDC 120. Any one of the two power connector inlets PC1, and PC2, may correspond to the low-voltage side LS, and the other may correspond to the high-voltage side HS. Such a FDC 120 is applied to the system shown in FIG. 2B, two different FDCs 120A and 120B may be mounted adjacent to each other in the vehicle. For example, in the case where two different FDCs 120A and 120B are vertically stacked, the connector connected to the first fuel cell 110A is failed to interlock to the low-voltage side LS1 of the FDC1 120A due to an operator error during vehicle production or maintenance, and there is a risk that a connector connected to the second fuel cell 110B may be failed to interlock to the low-voltage side LS2 of the FDC2 120B.

In the fuel cell DC-DC converter, connectors being interlocked or failing to interlock may be detected through an interlock device. It will be described with reference to FIGS. 5A and 5B.

Figure 5A:
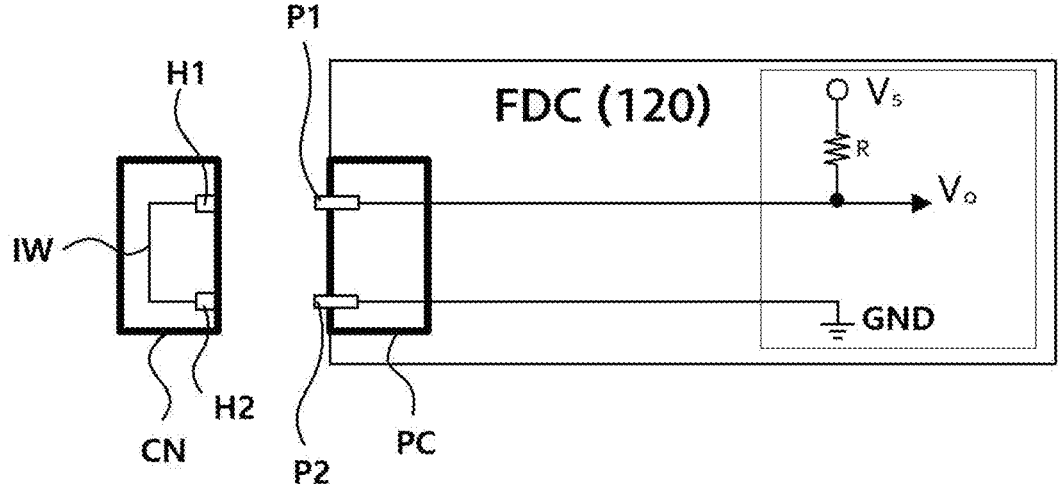
FIGS. 5A and 5B are views describing the principle of an interlock.
Figure 5B:
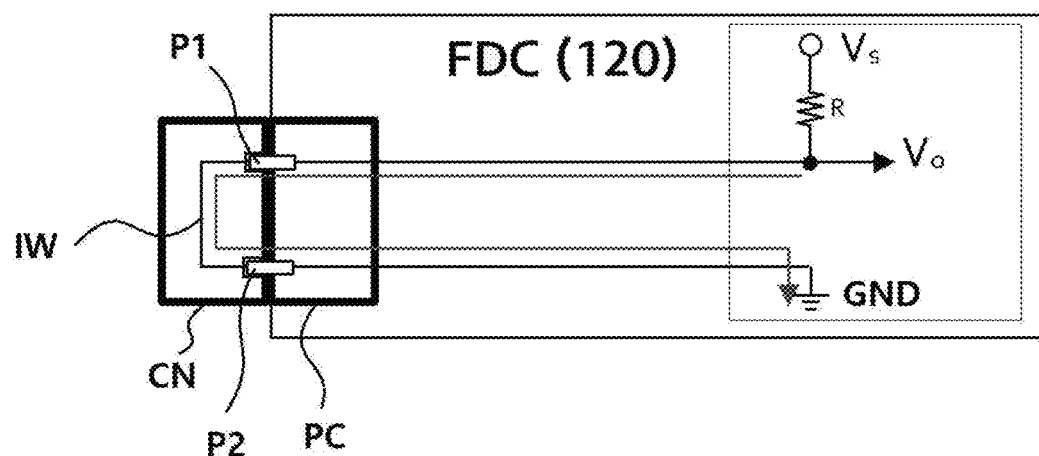

FIGS. 5A and 5B are views for describing the principle of interlock.

In FIGS. 5A and 5B, components for power transfer, for example, illustration of power transfer wires, are omitted, as components involved in the interlock function are mainly illustrated.

First, referring to FIG. 5A, a plurality of terminals, that is, a first pin P1 and a second pin P2, are provided at a DC link (e.g., LS) side of the FDC 120.

One end of the first pin P1 is electrically connected to the other end of the resistor R connected to the regulated voltage source Vs in the FDC 120, and the second pin P2 is electrically connected to the ground GND. In addition, a first pinhole H1 and a second pinhole H2, which are through holes, are provided in a cable connector CN, and the first pinhole H1 and the second pinhole H2 provide an access path from the outside to the interlock wiring part IW. Each pin P1 and P2, and the interlock wiring part may be formed of conductive materials.

The first pinhole H1 and the second pinhole H2 are disposed at positions allowing the insertion of the first pin P1 and the second pin P2, respectively, upon the cable connector CN is interlocked to the inlet PC, respectively. In a such state, the interlock output terminal voltage Vo corresponding to the node between the first pin P1 and the other terminal of the resistor R is equal to the voltage of the regulated voltage source Vs.

Once the cable connector CN is interlocked to the inlet PC, as illustrated in FIG. 5B, the first pin P1 is inserted into the first pinhole H1 and interlocked with one end of the interlock wiring part IW, the second pin P2 is inserted into the second pinhole H2 and interlocked with other end of the interlock wiring part IW. Accordingly, the first pin P1 and the second P2 are short circuited to each other by the interlock wiring part IW, in which the interlock output terminal is connected to the ground GND. Accordingly, the interlock output terminal voltage Vo may be 0 volts.

Ultimately, by monitoring the interlock output terminal voltage Vo in the FDC 120 using the interlock recognition apparatus, it is possible to determine whether the cable connector CN is interlocked to the inlet PC.

However, as described above, in the case of using the interlock recognition apparatus using two pins, it is only possible to determine whether the device is interlocked or not, and it is difficult to determine whether it is erroneously interlocked. Accordingly, in an embodiment of present disclosure, a plurality of pinholes, which is more than two, are provided, when interlocking a connector, by selectively using a plurality of interlock wiring parts corresponding to each combination of two different pins among a plurality of pins, it is proposed that the DC-DC converter can determine whether the connector is interlocked or not, as well as whether it is erroneously interlocked. A resistor may be disposed between the adjacent pins, and each resistance value may be selected such that the voltage of the interlock output terminal is different according to the type of interlock wiring part.

Figure 6A:
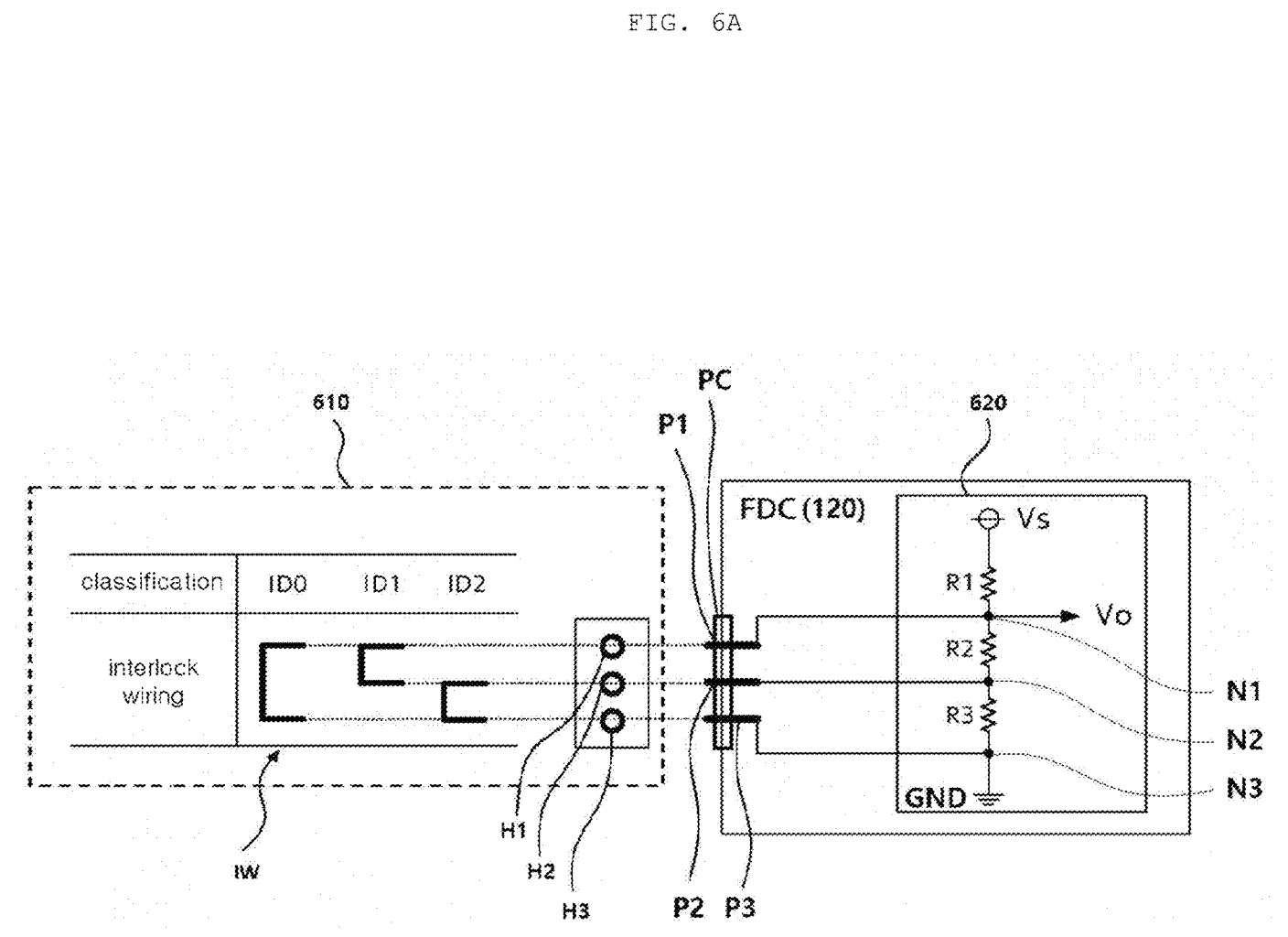

Hereinafter, an interlock recognition apparatus according to an embodiment will be described with reference to FIGS. 6A to 7. FIGS. 6A to 7 illustrate an interlock recognition apparatus using three pins and three pinholes, this is exemplary and an interlock recognition apparatus using more than three pins and pinholes also falls within the scope of the present disclosure.

Figure 6B:
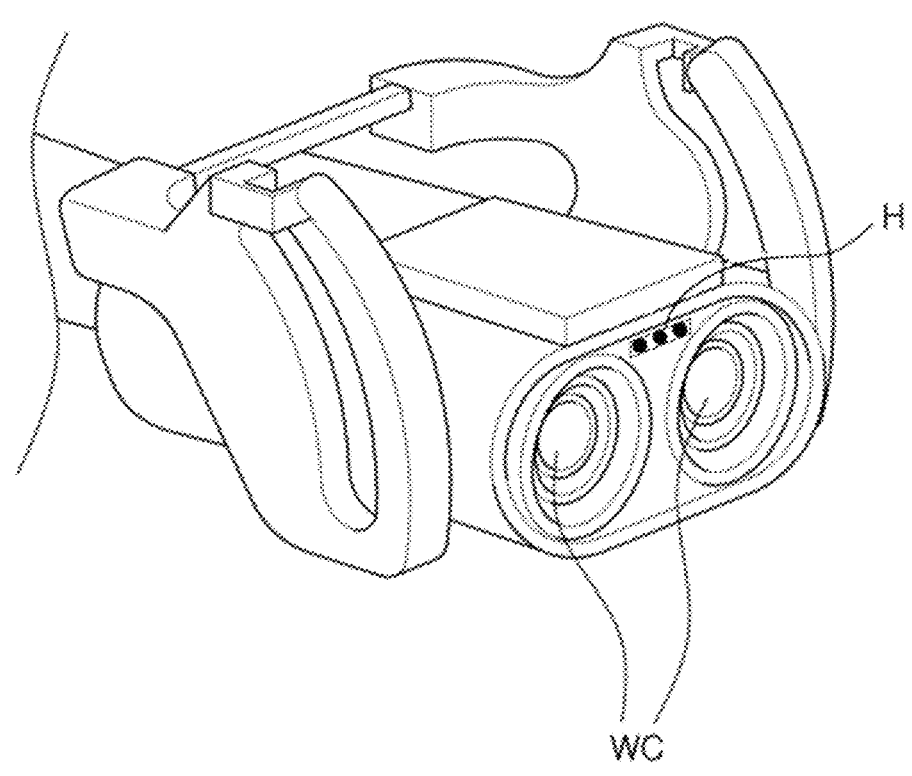
FIG. 6B shows an example of a connector having an interlock pinhole according to an embodiment.
Figure 7:
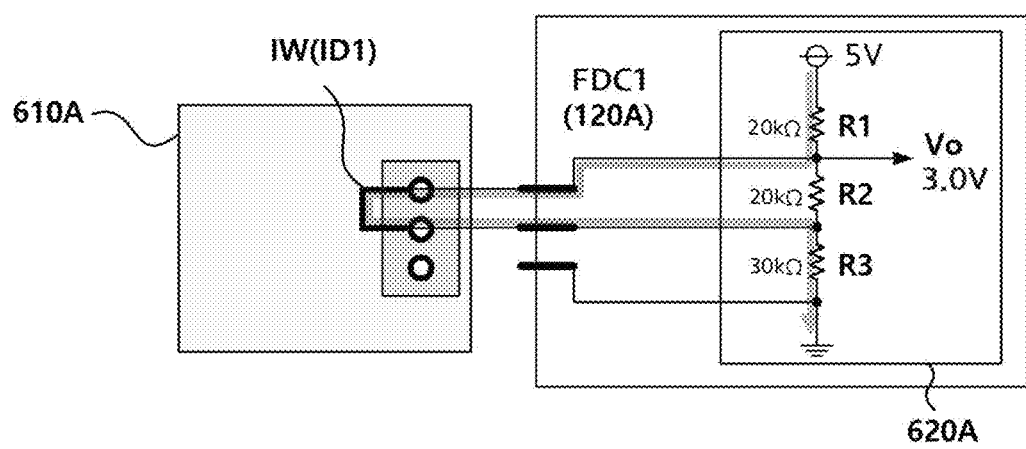
FIG. 7 is a view for describing a normal interlock state of a connector in which an interlock is applied for each DC-DC converter according to an embodiment of the present disclosure.
Figure 7:
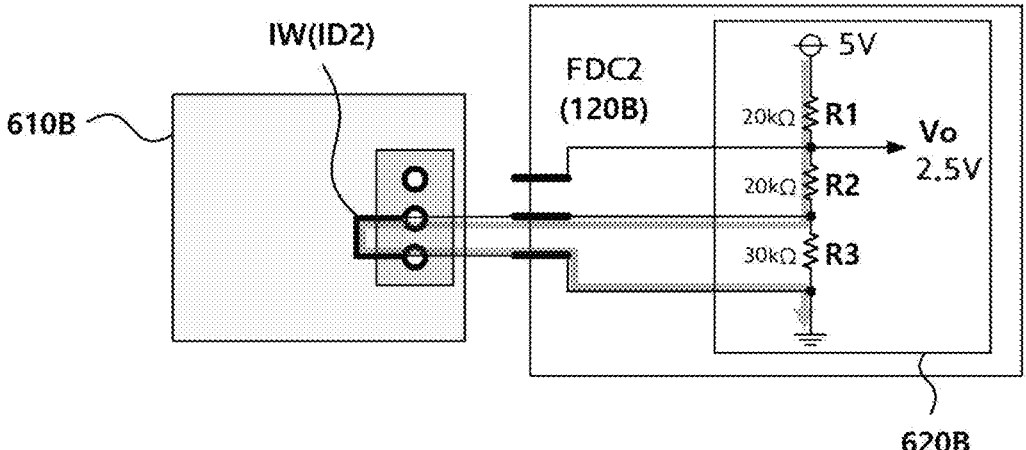

FIG. 6A shows an interlock recognition apparatus according to an embodiment of the present disclosure, and FIG. 6B shows an example of a connector having an interlock pinhole according to an embodiment.

First, referring to FIG. 6A, the interlock recognition apparatus according to an embodiment may include a plurality of pinholes H1, H2, and H3 on the cable connector 610 side, an interlock wiring part IW having a plurality of types, a plurality of terminals (i.e., a plurality of pins P1, P2, and P3) on the FDC 120 side, and an interlock recognition circuit 620.

Specifically, the first pinhole H1, the second pinhole H2, and the third pinhole H3, which are through holes, are provided in a cable connector 610, and the first pinhole H1 to the third pinhole H3 provide an access path from the outside to the interlock wiring part IW. The interlock wiring part may include three types of ID0, ID1, and ID2, and any one of the three types may be disposed in the cable connector 610. Each type of interlock wiring part may correspond to a combination of two different holes among three holes, respectively. For example, both ends of the first type ID1 correspond to the first hole H1 and the second hole H2, respectively, and both ends of the second type ID2 are connected to the second hole H2 and the third hole H3, and both ends of the third type ID0 correspond to the first hole H1 and the third hole H3, respectively.

In addition, a first pin P1, a second pin P2, and a third pin P3 are provided in one DC link (e.g., LS) side inlet PC of the FDC 120. The first pinhole H1, the second pinhole H2, and the third pinhole H3 are disposed at positions allowing the insertion of the first pin P1, the second pin P2, and the third pin P3, respectively, upon the cable connector CN is interlocked to the inlet PC, respectively. Each pin P1, P2, and P3 is electrically connected to the interlock recognition circuit 620.

The interlock recognition circuit 620 may include a regulated voltage source Vs and a plurality of resistors connected with each other in series between the regulated voltage source Vs and the ground GND. One end of the resistor among the plurality of resistors may be connected to the regulated voltage source Vs, and the other end of the resistor may be connected to a node where any one terminal among the plurality of pins and the one end of another resistor are electrically connected. The number of the plurality of pins and the number of the plurality of resistors may be the same. In addition, each of the plurality of pins may be connected to one of connection nodes between two adjacent resistor pairs among the plurality of resistors and the grounds.

Specifically, one end of a first resistor R1 is connected to a regulated voltage source Vs, and the other end of the first resistor R1 may be connected to one end of a second resistor R2 and a first node N1 connected to the first pin P1. Here, the first node N1 may belong to an interlock output terminal. In addition, the other end of the second resistor R2 may be connected to one end of a third resistor R3 and a second node N2 connected to the second pin P2. Further, the other end of the third resistor R3 may be connected to a third node N3 connected to the third pin P3 and the ground GND. Here, the third node may be referred to as a ground node.

When the cable connector 610 in the interlock recognition apparatus described above is connected to the inlet PC of the FDC 120, according to the interlock wiring IW disposed on the cable connector 610, a resistor configuration in which the voltage of the regulated voltage source Vs is distributed may differ, therefore the interlock output terminal voltage Vo inside the interlock recognition circuit 620 may be determined. The converter controller 123 may determine whether the connector is interlocked or not, based on the interlock output terminal voltage Vo, and whether the connector is erroneously interlocked. A type of specific interlock wiring IW according to the voltage distribution form is as follows in Table 1.

TABLE 1

| Classification | Vo | Reference (Ex: Vs = 5 V, R1 = R2 = 20 kΩ, R3 = 30 kΩ) |
|---|---|---|
| Interlock Failure | $\dfrac{R2 + R3}{R1 + R2 + R3} * Vs$ | 3.6 V |
| Interlock ID0 | 0 V | 0 V |
| ID1 | $\dfrac{R3}{R1 + R3} * Vs$ | 3.0 V |
| ID2 | $\dfrac{R2}{R1 + R2} * Vs$ | 2.5 V |

In Table 1, in the 'Vo' column, the interlock output terminal voltage Vo is divided according to the combined resistance of the first resistor R1 and the resistors electrically conducted by the pins which interlock power terminal voltage Vo is short circuited according to the type of the first resistor R1 and the interlock wiring IW is shown for each interlocking situation. In addition, in the 'Reference' column, the cases of assumptions of the interlock output terminal voltage being exemplified for each interlocking situation are shown, where the voltage value of the regulated voltage source Vs is set to 5V, the values of the first resistor R1 and the second resistor R2 are set to 20 kΩ, and the value of the third resistor R3 is set to 30 kΩ. Specifically, in the state where the cable connector 610 is failed to interlock, the regulated voltage source Vs is distributed to R1:(R2+R3), when the cable connector having the ID0 type interlock wiring IW is interlocked, the interlock output terminal is connected to the ground GND, so the interlock output terminal voltage Vo becomes 0 V. In addition, when the cable connector having the interlock wiring of ID1 type is interlocked, the voltage of the regulated voltage source Vs is distributed to R1:R3, and when the cable connector having the ID2 type interlock wiring IW is interlocked, the voltage of the regulated voltage source Vs is distributed to R1:R2.

As described with reference to Table 1, the interlock recognition apparatus according to an embodiment may know whether the cable connector is interlocked as well as whether the cable connector is erroneously interlocked, and in the case where the interlock output voltage Vo for each type of connector is held, even the type of interlocked connector can be distinguished. Accordingly, as shown in Table 2 below, the purpose of the connector may be classified according to the type of the interlock wiring part IW.

TABLE 2

| Connector Classification | Application type | Reference |
|---|---|---|
| First connector | ID1 | For FDC1 interlock |
| Second connector | ID2 | For FDC2 interlock |
| Third connector | ID0 | FDC3 or for single FDC interlock |

Referring to Table 2, when the first connector and the second connector are used together, the first connector and the second connector can be applied to a system using two fuel cells 110A and 110B and two FDCs 120A and 120B as shown in FIG. 2B, and when the third connector is used alone, the third connector can be applied to a system using a single fuel cell 110 and a single FDC 120 as shown in FIG. 2A. Alternatively, when the first to third connectors are used together, it is applicable to a system using three fuel cells and three FDCs. Of course, an example of application type shown in Table 2 are exemplary and not necessarily limited thereto.

In the mechanical implementation, as shown in FIG. 6B, a plurality of pinholes H may be arranged side by side around the wiring connector WC of the power transmission wire in the cable connector 610. However, the arrangement of the pinholes H is exemplary, and each pinhole may be disposed not to be parallel to each other. In addition, although not illustrated, the plurality of pins disposed in the inlet on the side of the FDC 120 may also have an arrangement shape corresponding to the pinhole H.

FIG. 7 is a view for describing a normal interlock state of a connector in which an interlock is applied for each DC-DC converter according to an embodiment of the present disclosure.

In FIG. 7, it is assumed that a system using two fuel cells 110A and 110B and two FDCs 120A and 120B is applied to the voltage and resistance assumption according to the "Reference" column of Table 1 and the interlock recognition apparatus according to the connector application as shown in Table 2.

Referring to FIG. 7, the first connector 610A to which the interlock wiring part IW of the first type ID1 is applied is used for the connection between the first fuel cell 110A and the FDC1 120A, a second connector 610B to which an interlock wiring part IW of the second type ID2 is applied is used for the connection between the second fuel cell 110B and the FDC2 120B.

As the first connector 610A is interlocked to the FDC1 120A, the regulated voltage of the interlock recognition circuit 620A of the FDC1 120A may be distributed to R1 and R3, and the interlock output terminal voltage Vo may be 3 V. The converter controller 123 of the FDC1 120A may determine that the connector is normally interlocked when the interlock output terminal voltage Vo is 3 V. Of course, in determining the normal interlocking, a normal voltage range in which a predetermined voltage margin (e.g., ±0.2 V) is applied to the normal voltage may be used.

In addition, as the second connector 610B is interlocked to the FDC2 120B, the regulated voltage of the interlock recognition circuit 620B of the FDC2 120B is distributed to R1 and R2. The converter controller 123 of the FDC1 120B may determine that the connector is normally interlocked when the interlock output terminal voltage Vo is 2.5 V. Of course, in determining the normal interlocking, a normal voltage range in which a predetermined voltage margin (e.g., ±0.2 V) is applied to the normal voltage may be used.

Figure 8:
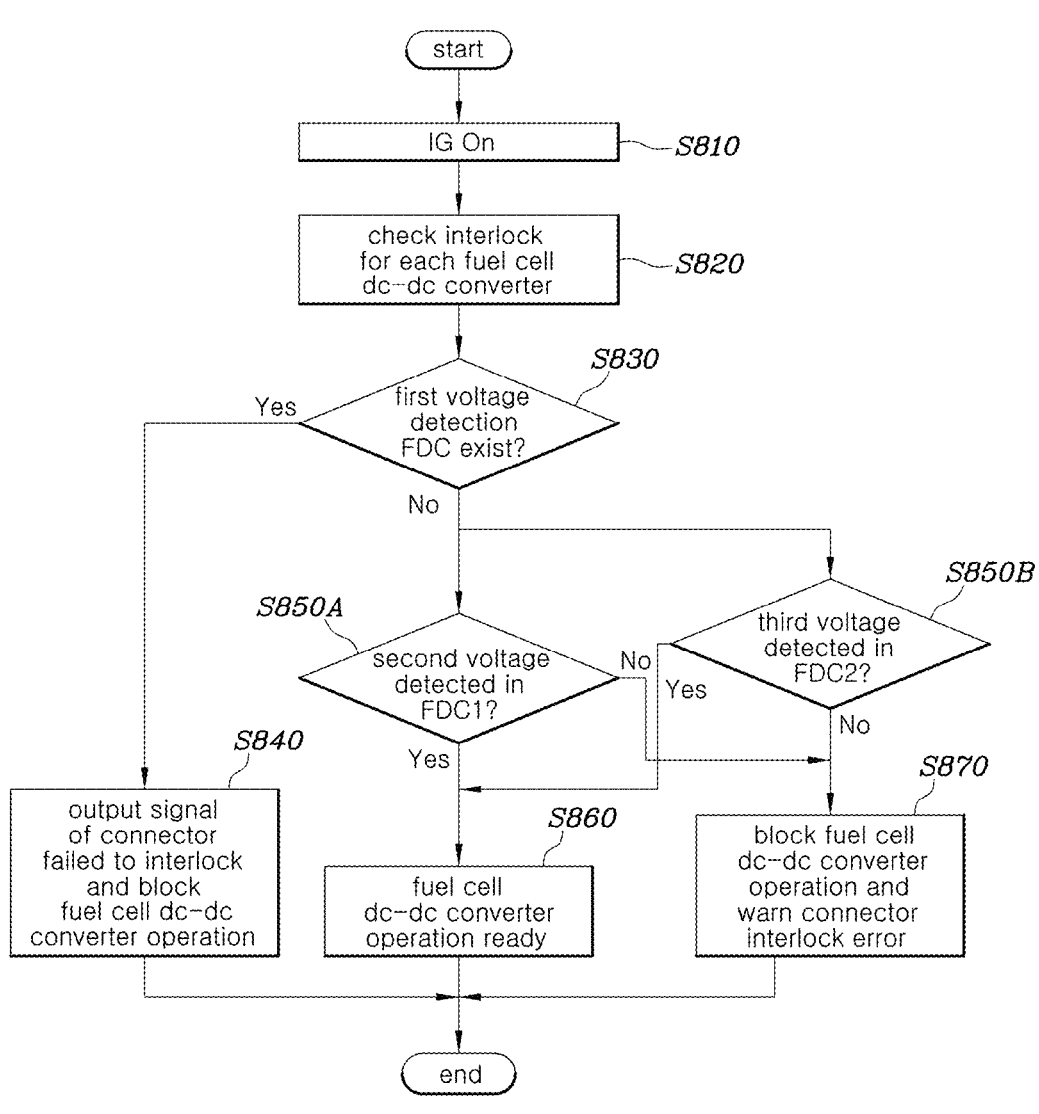
FIG. 8 is a flowchart showing an example of control process of a vehicle according to an embodiment of the present disclosure.

The control process for detecting the connector interlocking state according to the embodiment described so far is summarized in a flowchart as shown in FIG. 8.

FIG. 8 is a flowchart showing an example of control process of a vehicle according to an embodiment of the present disclosure. In FIG. 8, a system using two FDCs as shown in FIG. 2B is assumed.

Referring to FIG. 8, a request for applying auxiliary power IG ON to the vehicle is generated (S810). Here, the occurrence of an auxiliary power application request may imply that the driver operates the start button or receives a remote start signal, and thus, the power state of the vehicle may be controlled to the IG ON state. In the IG ON state, driving power may be applied to various controllers, relays, and indicator lighting devices of the vehicle including the DC-DC converter. In the IG ON state, driving power is applied to various controllers to complete preparation for operation, and in the IG START state, a request to start the vehicle may occur.

An interlock check may be performed in each of the FDCs 120A and 120B according to the application of the auxiliary power (S820). Performing the interlock check means that the interlock output terminal voltage Vo is measured in the converter controller 123 by applying a voltage through a regulated voltage source to the interlock recognition circuits 620A and 620B of the DC-DC converters 120A and 120B.

Based on the output terminal voltage, each FDC may determine whether it is an interlock failure, interlock error, or normal interlock (S830, S850A, and S850B).

Specifically, a first voltage corresponding to the interlock failure voltage (For example, according to the 'Reference' column of Table 1, when there is the DC-DC converter in which 3.6 V or a voltage range to which a predetermined margin is applied) is detected (Yes in S830), the output of the connector failed to interlock warning signal, and operation blocking may be performed (S840) in the FDC. For example, the FDC may stop the operation by sending fault information (e.g., S360A, S360B, and S360C of FIG. 3) corresponding to the interlock failure situation to an output device such as a cluster and performing a shutdown. Accordingly, the output device may output warning information in a predetermined form. For example, the output of the warning information may include visual information display through a cluster, smart device notification through telematics communication, and warning sound output through a speaker, but is not limited thereto.

In addition, each FDC may determine whether the interlock output terminal voltage is a normal voltage (or a normal voltage range) preset to each other (No in S830 to S850A and S850B).

For example, the FDC1 120A may perform a normal operation preparation procedure (S860) when a second voltage (e.g., 3 V according to the 'Reference' column in Table 1) corresponding to the normal interlock of the connector is detected at the interlock output terminal (Yes in S850A), otherwise (No in S850A), the operation may be blocked, and an erroneous interlock warning signal may be output (S870).

In addition, when a third voltage corresponding to the normal interlock of the connector (e.g., 2.5 V according to the 'Reference' column of Table 1) is detected at the interlock output terminal (Yes in S850B), the FDC2 120B may perform a normal operation preparation procedure (S860), otherwise (No in S850B), the operation may be blocked and output an interlock error warning signal (S870).

Meanwhile, according to another embodiment of the present disclosure, based on the principle of the interlock recognition apparatus using more than pins above mentioned, a device for identifying the type of cable connector, that is, the type of interlock wiring part IW within the connector, is provided. The device will be described with reference to FIG. 9.

Figure 9:
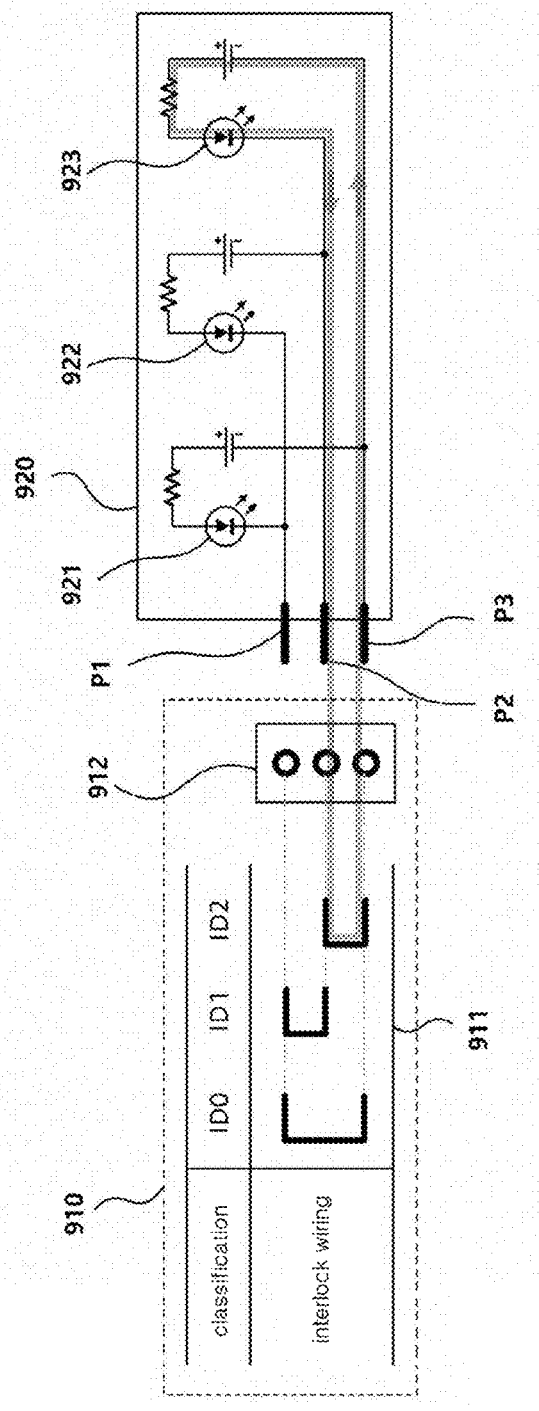
FIG. 9 is a view describing a connector type detection apparatus according to another embodiment of the present disclosure.

FIG. 9 is a diagram describing a connector type detection device according to another embodiment of the present disclosure.

Referring to FIG. 9, a connector 910 and a connector type detection device 920 are illustrated. Here, since the configuration of the connector 910 is similar to that described above with reference to FIG. 6A, redundant description thereof will be omitted for simplicity of the specification, and the connector type detection device 920 will be mainly described.

The connector type detection device 920 may include a plurality pins P1, P2, and P3 corresponding to a pinhole 912 of the connector 910, and a plurality of light emitting elements 921, 922, and 923 that are selectively lit according to the type of the interlock wiring 911. For example, as illustrated in FIG. 9, When the cable to which the ID2 type interlock wiring part 911 is applied is interlocked, the third light emitting element 923 and the power connected thereto by the interlock wiring part 911 may form a closed circuit, and the third light emitting element 923 may be turned on.

Although FIG. 9 illustrates a device capable of identifying three types of cable connectors using three pins, this is exemplary, and the present disclosure is not limited thereto. That is, when one of a plurality of combinations including two different pins is short circuited by an interlock wiring IW, a closed circuit is formed so that one corresponding light emitting element is turned on, the present disclosure is not limited to the configuration of a circuit.

On the other hand, in the above-described embodiments, in the above-described embodiments, it is assumed that the terminal of the inlet short circuited by the interlock wiring IW is implemented in the form of a pin, but this is exemplary and is not limited to any type of terminal other than a pin as long as it performs a contact function that can be short circuited by contact with the interlock wiring IW.

The present disclosure mentioned in the foregoing description may be implemented as code that can be written to a computer-readable recording medium and can thus be read by a computer system. The computer-readable medium may include all kinds of recording devices in which data readable by a computer system is stored. Examples of computer-readable medium includes hard disk drive (HDD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

What is claimed is:

1. A fuel cell DC-DC converter comprising:
a plurality of terminals having more than two terminals disposed in an inlet corresponding to one DC link;
an interlock recognition circuit electrically connected to the plurality of terminals; and
a converter controller configured to determine a connector interlock state of the inlet based on an output terminal state of the interlock recognition circuit,
wherein the output terminal state of the interlock recognition circuit is determined based on whether a connector having an interlock wiring part is connected to the inlet and a type of the interlock wiring part,
wherein the interlock wiring part is configured to short circuit different two terminals of the plurality of terminals when the connector is connected to the inlet,
wherein the interlock recognition circuit comprises:
a regulated voltage source; and
a plurality of resistors mutually connected in series between the regulated voltage source and a ground,
wherein the fuel cell DC-DC converter further comprises a plurality of inlets corresponding to different DC links and a plurality of interlock recognition circuits, and wherein a number of the plurality of inlets corresponds to a number of the plurality of interlock recognition circuits, wherein the interlock recognition circuit comprises a plurality of light emitting elements, and wherein each of the plurality of light emitting elements is connected to two different terminals of the plurality of terminals and is selectively lit according to the type of the interlock wiring part, and wherein each of the plurality of terminals is connected to two different light emitting elements among the plurality of light emitting elements.

2. The fuel cell DC-DC converter of claim 1, wherein the interlock wiring part includes a plurality of types according to a combination of different two terminals among the plurality of terminals.

3. The fuel cell DC-DC converter of claim 1, wherein one end of the resistor among the plurality of resistors is connected to the regulated voltage source, and the other end of the resistor is connected to a node where any one terminal among the plurality of terminals and the one end of another resistor are electrically connected.

4. The fuel cell DC-DC converter of claim 3, wherein the output terminal state includes an output terminal voltage corresponding to voltage of the node.

5. The fuel cell DC-DC converter of claim 4, wherein the converter controller configured to:

in response to the output terminal voltage which is a first voltage, determine that the connector is failed to interlock;

in response to the output terminal voltage which is a second voltage, determine that the connector is normally interlocked; and in response to the output terminal voltage which is a third voltage, determine that the connector is erroneously interlocked.

6. The fuel cell DC-DC converter of claim 5, wherein in response to a determination that the connector is failed to interlock or erroneously interlocked, the converter controller is configured to output a warning signal corresponding to a determined result to the outside.

7. The fuel cell DC-DC converter of claim 1, wherein the number of the plurality of terminals and the number of the plurality of resistors are the same.

8. The fuel cell DC-DC converter of claim 1, wherein each of the plurality of terminals is connected to one of connection nodes between two adjacent resistor pairs among the plurality of resistors and the ground.

9. The fuel cell DC-DC converter of claim 1, wherein each of the plurality of terminals is pin-shaped, and the connector includes a plurality of pinholes allowing penetration of each of the plurality of terminals.

10. A vehicle comprising:

a first fuel cell DC-DC converter; and a second fuel cell DC-DC converter, wherein each of the first fuel cell DC-DC converter and the second fuel cell DC-DC converter comprises:

a plurality of terminals having more than two terminals disposed in an inlet corresponding to one DC link;

an interlock recognition circuit electrically connected to the plurality of terminals; and a converter controller configured to determine a connector interlock state of the inlet based on the output terminal state of the interlock recognition circuit, wherein the interlock recognition circuit is configured to:

determine the output terminal state of the interlock recognition circuit based on whether a connector having an interlock wiring part is connected to the inlet and a type of the interlock wiring part, the interlock wiring part being configured to short circuit different two terminals of the plurality of terminals when the connector is connected to the inlet; and the converter controller of the first fuel cell DC-DC converter and the converter controller of the second fuel cell DC-DC converter have different state of the output terminal corresponding to the normal connector interlock state, and wherein the interlock recognition circuit comprises:

a regulated voltage source;

a plurality of light emitting elements; and a plurality of resistors mutually connected in series between the regulated voltage source and a ground, wherein each of the first fuel cell DC-DC converter and the second fuel cell DC-DC converter further comprises a plurality of inlets corresponding to different DC links and a plurality of interlock recognition circuits, and wherein a number of the plurality of inlets corresponds to a number of the plurality of interlock recognition circuits, wherein each of the plurality of light emitting elements is connected to two different terminals of the plurality of terminals and is selectively lit according to the type of the interlock wiring part, and wherein each of the plurality of terminals is connected to two different light emitting elements among the plurality of light emitting elements.

11. The vehicle of claim 10, wherein the interlock wiring part includes a plurality of types according to a combination of different two among the plurality of terminals.

12. The vehicle of claim 10, wherein one end of a resistor among the plurality of resistors is connected to the regulated voltage source, and the other end of the resistor is connected to a node where any one terminal among the plurality of terminals and the one end of another resistor are electrically connected.

13. The vehicle of claim 12, wherein the output terminal state includes an output terminal voltage corresponding to the voltage of the node.

* * * * *